(12) United States Patent
Li et al.

(10) Patent No.: US 12,254,664 B2
(45) Date of Patent: Mar. 18, 2025

(54) COMPUTING DEVICE, METHOD AND APPARATUS FOR RECOMMENDING AT LEAST ONE OF A MAKEUP PALETTE OR A HAIR COLORATION SCHEME

(71) Applicant: L'OREAL, Paris (FR)

(72) Inventors: Shuting Li, Shanghai (CN); Tingting Zhu, Shanghai (CN); Qing Jiang, Shanghai (CN); Jun Wu, Shanghai (CN); Honghui Liu, Shanghai (CN)

(73) Assignee: L'OREAL, Paris (FR)

( * ) Notice: Subject to any disclaimer, the term of this patent is extended or adjusted under 35 U.S.C. 154(b) by 290 days.

(21) Appl. No.: 17/632,453

(22) PCT Filed: Aug. 21, 2019

(86) PCT No.: PCT/CN2019/101742
§ 371 (c)(1),
(2) Date: Feb. 2, 2022

(87) PCT Pub. No.: WO2021/031147
PCT Pub. Date: Feb. 25, 2021

(65) Prior Publication Data
US 2022/0277542 A1      Sep. 1, 2022

(51) Int. Cl.
*G06V 10/56*       (2022.01)
*G06Q 30/0601*   (2023.01)
(Continued)

(52) U.S. Cl.
CPC ......... *G06V 10/56* (2022.01); *G06Q 30/0631* (2013.01); *G06T 7/90* (2017.01);
(Continued)

(58) Field of Classification Search
CPC .. G06Q 30/0282; G06Q 30/0631; G06T 7/90; G06T 11/00; G06T 2207/10024;
(Continued)

(56) References Cited

U.S. PATENT DOCUMENTS

| 7,437,344 B2 | 10/2008 | Peyrelevade |
| 9,058,765 B1 * | 6/2015 | Mallick ............... G06Q 30/0256 |

(Continued)

FOREIGN PATENT DOCUMENTS

| CN | 104573721 A | 4/2015 |
| CN | 104574310 A | 4/2015 |

(Continued)

OTHER PUBLICATIONS

Florea et al. "Skin Segmentation of Facial Images in the Compressed Domain With Applications in Cosmetics" Buletinul Institutului Politehnic Din IAȘI Publicat de Universitatea Tehnică, 2011 (Year: 2011).*

(Continued)

*Primary Examiner* — Katrina R Fujita
(74) *Attorney, Agent, or Firm* — Oblon, McClelland, Maier & Neustadt, L.L.P.

(57) ABSTRACT

Method and apparatus for recommending at least one of a makeup palette or a hair coloration scheme are provided. The method comprises extracting a color set of at least one region of a digital image associated with a user (201); generating color recommendation information for at least one of a makeup palette or a hair coloration scheme for at least two other regions of the digital image associated with the user based on one or more inputs indicative of the extracted color set (202); and generating one or more instances of a virtual representation of a makeup palette recommendation or a hair coloration scheme recommendation based on the color recommendation information (203).

20 Claims, 9 Drawing Sheets

(51) Int. Cl.
*G06T 7/90* (2017.01)
*G06T 11/00* (2006.01)
*G06V 10/22* (2022.01)
*G06V 10/764* (2022.01)
*G06V 10/774* (2022.01)
*G06V 40/10* (2022.01)

(52) U.S. Cl.
CPC .............. *G06T 11/00* (2013.01); *G06V 10/22* (2022.01); *G06V 10/764* (2022.01); *G06V 10/774* (2022.01); *G06V 40/10* (2022.01); *G06T 2207/10024* (2013.01); *G06T 2207/20081* (2013.01); *G06T 2207/20092* (2013.01); *G06T 2207/30196* (2013.01)

(58) Field of Classification Search
CPC . G06T 2207/20081; G06T 2207/20092; G06T 2207/30196; G06V 10/22; G06V 10/56; G06V 10/7625; G06V 10/764; G06V 10/774; G06V 40/10
See application file for complete search history.

(56) References Cited

U.S. PATENT DOCUMENTS

| | | | |
|---|---|---|---|
| 10,339,685 B2* | 7/2019 | Fu | G06T 3/18 |
| 10,691,932 B2* | 6/2020 | Lee | G06T 11/60 |
| 10,939,742 B2* | 3/2021 | Fu | G06T 11/60 |
| 2003/0065578 A1 | 4/2003 | Peyrelevade et al. | |
| 2007/0058858 A1* | 3/2007 | Harville | G06Q 30/02 |
| | | | 382/165 |
| 2011/0099122 A1 | 4/2011 | Bright et al. | |
| 2013/0073490 A1* | 3/2013 | Baughman | G06N 3/126 |
| | | | 706/13 |
| 2018/0374140 A1* | 12/2018 | Stucki | G06V 40/168 |
| 2019/0014884 A1* | 1/2019 | Fu | G06V 40/168 |
| 2019/0104827 A1 | 4/2019 | Nishi et al. | |
| 2019/0164210 A1* | 5/2019 | Kornilov | G06Q 30/0631 |
| 2019/0244274 A1* | 8/2019 | Chang | G06V 40/171 |
| 2019/0362134 A1* | 11/2019 | Kim | G06V 10/82 |

FOREIGN PATENT DOCUMENTS

| | | |
|---|---|---|
| CN | 104766127 A | 7/2015 |
| CN | 106599549 A | 4/2017 |
| CN | 108376352 A | 8/2018 |
| JP | 2003-504131 A | 2/2003 |
| JP | 2010-211308 A | 9/2010 |

OTHER PUBLICATIONS

Kim et al. "A personalized recommendation procedure for Internet shopping support." Electronic commerce research and applications 1.3-4 (2002): 301-313. (Year: 2002).*
Alashkar et al. "Rule-based facial makeup recommendation system." 2017 12th IEEE International conference on automatic face & gesture recognition (FG 2017). IEEE, 2017. (Year: 2017).*
Extended European Search Report issued on Mar. 27, 2023 in European Patent Application No. 19942322.9, 7 pages.
International Search Report mailed on May 22, 2020 in PCT/CN2019/101742 filed on Aug. 21, 2019 (4 pages).
Office Action issued Feb. 20, 2023, in corresponding Japanese Patent Application No. 2021-576377 (with English Translation), 7 pages.
Japanese Office Action issued Aug. 28, 2023 in Japanese Patent Application No. 2021-576377 (with English translation), 6 pages.
Japanese Office Action issued Jan. 25, 2024 in Japanese Patent Application No. 2021-576377 (with English translation), 7 pages.
Japanese Office Action issued May 27, 2024 in Japanese Patent Application No. 2021-576377 (with English Translation), 4 pages.
Chinese Office Action dated Sep. 21, 2024, issued in Chinese Patent Application No. 201980099569.9 (with English translation).
Chinese Office Action dated January 8. 2025, issued in Chinese Patent Application No. 201980099569.9 (with English translation).
European Office Action dated Jan. 21, 2025, issued in European Patent Application No. 19 942 322.9.

* cited by examiner

| content | hair | eye bri | skin | lip | Harmony total score |
|---|---|---|---|---|---|
| light brown-brown-beige-pink | light brow | brown | beige | pink | -34 |
| brown-grey-beige-pink | brown | grey | beige | pink | -30 |
| dark brown-grey-beige-pink | dark brow | grey | beige | pink | -21 |
| light brown-grey-beige-pink | light brow | grey | beige | pink | -14 |
| black-brown-beige-pink | black | brown | beige | pink | -11 |
| black-grey-beige-pink | black | grey | beige | pink | 1 |
| brown-brown-beige-pink | brown | brown | beige | pink | 4 |
| black-brown-beige-orange | black | brown | beige | orange | 4 |
| light brown-brown-beige-orange | light brow | brown | beige | orange | 24 |
| dark brown-brown-beige-pink | dark brow | brown | beige | pink | 26 |
| black-brown-beige-orange | black | brown | beige | orange | 26 |
| dark brown-grey-beige-orange | dark brow | grey | beige | orange | 31 |
| light brown-grey-beige-orange | light brow | grey | beige | orange | 34 |
| black-grey-beige-orange | black | grey | beige | orange | 36 |
| brown-brown-beige-orange | brown | brown | beige | orange | 45 |
| light brown-brown-beige-red | light brow | brown | beige | red | 52 |
| brown-grey-beige-orange | brown | grey | beige | orange | 55 |
| black-grey-beige-red | black | grey | beige | red | 59 |
| light brown-grey-beige-red | light brow | grey | beige | red | 67 |
| dark brown-brown-beige-orange | dark brow | brown | beige | orange | 68 |
| brown-brown-beige-red | brown | brown | beige | red | 69 |
| black-brown-beige-red | black | brown | beige | red | 73 |
| brown-grey-beige-red | brown | grey | beige | red | 85 |
| dark brown-grey-beige-red | dark brow | grey | beige | red | 87 |
| dark brown-brown-beige-red | dark brow | brown | beige | red | 104 |

Fig.3

COMPUTING DEVICE, METHOD AND APPARATUS FOR RECOMMENDING AT LEAST ONE OF A MAKEUP PALETTE OR A HAIR COLORATION SCHEME

TECHNICAL FIELD

The disclosure relates to the field of beauty industry. More specifically, the disclosure relates to a computing device, method and apparatus for recommending at least one of a makeup palette or a hair coloration scheme.

BACKGROUND

Beauty has always been a pursue of the consumers. Researches show that the appearance of an individual has a meaningful impact not only on his/her confidence, but also on the first impression of others. Among all, people pay more attention to color matching when selecting cosmetic products, such as makeup products, hair coloration products, and other cosmetic products.

However, it is difficult for the consumers to select the expected colors.

In the related prior art, usually color experts such as makeup KOLs give recommended color match based on personal experiences and color theory. However, such an approach is subjective and can only recommend harmonious color matching for pairs of regions, and thus does not satisfy the need for recommending harmonious color matching for more regions. Therefore, there is a need to recommend colors of makeup and/or hair coloration for more regions in order to render a color-wise harmonious natural look.

SUMMARY

The summary is provided to introduce a selection of concepts in a simplified form that are further described below in detailed description. This summary is not intended to identify key features or essential features of the claimed subject matter, nor is it intended to be used to limit the scope of the claimed subject matter.

Various aspects and features of the disclosure are described in further detail below.

According to a first aspect of the disclosure, there is provided a computing device, comprising: an optimal color unit including computational circuitry which is configured to extract a color set of at least one region of a digital image associated with a user, and to generate color recommendation information for at least one of a makeup palette or a hair coloration scheme for at least two other regions of the digital image associated with the user based on one or more inputs indicative of the extracted color set; and a makeup and hair color unit including computational circuitry configured to generate one or more instances of a virtual representation of a makeup palette recommendation or a hair coloration scheme recommendation based on the color recommendation information.

In one embodiment of said first aspect of the disclosure, the optimal color unit includes computational circuitry which is further configured to store the extracted color set in a memory, locate said extracted color set into a sample training set, wherein said sample training set comprises information for colors of different regions of a plurality of sampled images, information for color combinations for different regions of said plurality of sampled images and information for total scores for each of color combinations; search color combinations which contain said extracted color set in said sample training set; rank total scores corresponding to said searched color combinations; generate recommended color combinations based on said ranked total scores.

In another embodiment of said first aspect of the disclosure, the optimal color unit includes computational circuitry which is further configured to generate color recommendation information for at least one of a makeup palette or a hair coloration scheme for at least two other regions of the digital image associated with the user based on one or more inputs indicative of the extracted color set by a prediction model. More particularly, said prediction model comprises one of Chi-squared Automatic Interaction Detector (CHAID) Decision tree model, Multi-variate Gaussian map classifier and so on.

In yet another embodiment of said first aspect of the disclosure, when said prediction model comprises Chi-squared Automatic Interaction Detector (CHAID) Decision tree model, the optimal color unit includes computational circuitry which is further configured to input said extracted color set to said CHAID Decision tree model, wherein said extracted color set is category type, said CHAID Decision tree model is trained from a sample training set, said sample training set comprises information for colors of different regions of a plurality of sampled images, information for color combinations for different regions of said plurality of sampled images and information for total scores for each of color combinations; generate color recommendation information for at least one of a makeup palette or a hair coloration scheme for at least two other regions of the digital image associated with the user.

In yet another embodiment of said first aspect of the disclosure, when said prediction model comprises Chi-squared Automatic Interaction Detector (CHAID) Decision tree model, the optimal color unit includes computational circuitry which is further configured to translate said extracted color set to corresponding numerical values of colors in a color space; input said corresponding numerical values of colors to said CHAID Decision tree model, said CHAID Decision tree model is trained from a sample training set, said sample training set comprises information for numerical values of colors for different regions of a plurality of sampled images and information for total scores for each of color combinations; generate color recommendation information for at least one of a makeup palette or a hair coloration scheme for at least two other regions of the digital image associated with the user.

In yet another embodiment of said first aspect of the disclosure, when said prediction model comprises Multi-variate Gaussian map classifier, the optimal color unit includes computational circuitry which is further configured to translate said extracted color set to corresponding numerical values of colors in a color space; input said corresponding numerical values of colors to said Multi-variate Gaussian map classifier, said Multi-variate Gaussian map classifier is trained from a sample training set, said sample training set comprises information for numerical values of colors for different regions of a plurality of sampled images and information for total scores for each of color combinations; generate color recommendation information for at least one of a makeup palette or a hair coloration scheme for at least two other regions of the digital image associated with the user.

According to a second aspect of the disclosure, there is provided a method for recommending at least one of a makeup palette or a hair coloration scheme, the method comprising extracting a color set of at least one region of a digital image associated with a user; generating color recommendation information for at least one of a makeup palette or a hair coloration scheme for at least two other regions of the digital image associated with the user based on one or more inputs indicative of the extracted color set; and generating one or more instances of a virtual representation of a makeup palette recommendation or a hair coloration scheme recommendation based on the color recommendation information.

In one embodiment of said second aspect of the disclosure, said generating color recommendation information for at least one of a makeup palette or a hair coloration scheme for at least two other regions of the digital image associated with the user based on one or more inputs indicative of the extracted color set comprises storing said extracted color set in a memory, locating said extracted color set into a sample training set, wherein said sample training set comprises information for colors of different regions of a plurality of sampled images, information for color combinations for different regions of said plurality of sampled images and information for total scores for each of color combinations; searching color combinations which contain said extracted color set in said sample training set; ranking total scores corresponding to said searched color combinations; generating recommended color combinations based on said ranked total scores.

In another embodiment of said second aspect of the disclosure, said generating color recommendation information for at least one of a makeup palette or a hair coloration scheme for at least two other regions of the digital image associated with the user based on one or more inputs indicative of the extracted color set is achieved by a prediction model. More particularly, said prediction model comprises one of Chi-squared Automatic Interaction Detector (CHAID) Decision tree model, Multi-variate Gaussian map classifier and so on.

In another embodiment of said second aspect of the disclosure, when said prediction model comprises Chi-squared Automatic Interaction Detector (CHAID) Decision tree model, said generating color recommendation information for at least one of a makeup palette or a hair coloration scheme for at least two other regions of the digital image associated with the user based on one or more inputs indicative of the extracted color set comprises inputting said extracted color set to said CHAID Decision tree model, wherein said extracted color set is category type, said CHAID Decision tree model is trained from a sample training set, said sample training set comprises information for colors of different regions of a plurality of sampled images, information for color combinations for different regions of said plurality of sampled images and information for total scores for each of color combinations; generating color recommendation information for at least one of a makeup palette or a hair coloration scheme for at least two other regions of the digital image associated with the user.

In yet another embodiment of said second aspect of the disclosure, when said prediction model comprises Chi-squared Automatic Interaction Detector (CHAID) Decision tree model, said generating color recommendation information for at least one of a makeup palette or a hair coloration scheme for at least two other regions of the digital image associated with the user based on one or more inputs indicative of the extracted color set comprises translating said extracted color set to corresponding numerical values of colors in a color space; inputting said corresponding numerical values of colors to said CHAID Decision tree model, said CHAID Decision tree model is trained from a sample training set, said sample training set comprises information for numerical values of colors in a color space for different regions of a plurality of sampled images and information for total scores for each of color combinations; generating color recommendation information for at least one of a makeup palette or a hair coloration scheme for at least two other regions of the digital image associated with the user.

In yet another embodiment of said second aspect of the disclosure, when said prediction model comprises Multi-variate Gaussian map classifier, said generating color recommendation information for at least one of a makeup palette or a hair coloration scheme for at least two other regions of the digital image associated with the user based on one or more inputs indicative of the extracted color set comprises translating said extracted color set to corresponding numerical values of colors in a color space; inputting said corresponding numerical values of colors to said Multi-variate Gaussian map classifier, said Multi-variate Gaussian map classifier is trained from a sample training set, said sample training set comprises information for numerical values of colors in a color space for different regions of a plurality of sampled images and information for total scores for each of color combinations; generating color recommendation information for at least one of a makeup palette or a hair coloration scheme for at least two other regions of the digital image associated with the user.

According to a third aspect of the disclosure, there is provided an apparatus for recommending at least one of a makeup palette or a hair coloration scheme, said apparatus comprises means for extracting color set of at least one region of a digital image associated with a user; means for generating color recommendation information for at least one of a makeup palette or a hair coloration scheme for at least two other regions of the digital image associated with the user based on one or more inputs indicative of the extracted color set; and means for generating one or more instances of a virtual representation of a makeup palette recommendation or a hair coloration scheme recommendation based on the color recommendation information.

According to a fourth aspect of the disclosure, there is provided computer readable medium having stored thereon instructions that when executed cause a computing device to perform the method of recommending at least one of a makeup palette or a hair coloration scheme according to a second aspect of the disclosure.

According to the disclosure, said at least one region, said at least two other regions and said different regions can be regions where a feature of a body of said user is located.

According to the disclosure, the invention allows consumers to easily select an optimal color scheme for multiple make-up or/and hair coloration (more than 2) at the same time, rendering a color-wise harmonious natural look. Besides, the invention can further extend the capability to give color advices for more consumers (including different ethnicity, groups or individual) by including new color options in training set using the same method.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 3 illustrates an example sample training set in accordance with the present disclosure;

DETAILED DESCRIPTION

Figure 1:
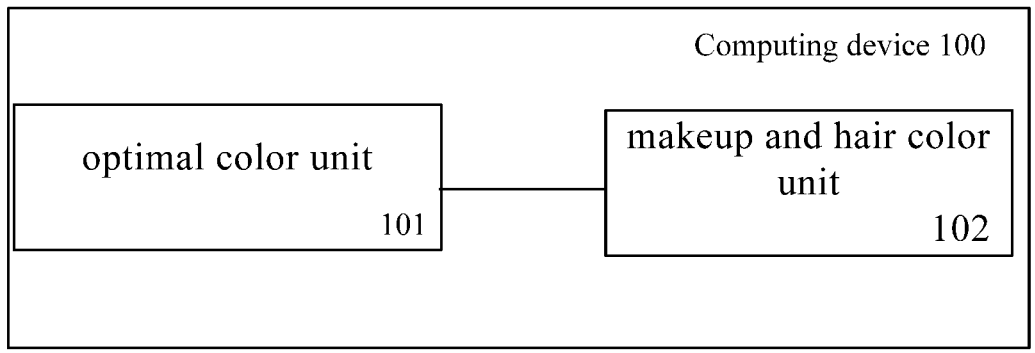
FIG. 1 illustrates a block diagram of a computing device in accordance with a first aspect of the present disclosure.

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, and/or groups thereof.

Unless otherwise defined, all terms (including technical and scientific terms) used herein have the same meanings as commonly understood. It will be further understood that a term used herein should be interpreted as having a meaning consistent with its meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program products according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that may contain, store, communicate, propagate, or transport the program for use by or in connection with the instruction execution system, apparatus, or device.

Embodiments herein will be described below with reference to the drawings.

FIG. 1 illustrates a block diagram of a computing device 100 in accordance with a first aspect of the present disclosure.

As shown in FIG. 1, the computing device 100 comprises an optimal color unit 101 and a makeup and hair color unit 102, both are coupled with each other. The optimal color unit 101 includes computational circuitry which is configured to perform the following actions.

In the disclosure, in order to obtain an optimal color scheme for multiple make-up and/or hair coloration, a digital image of a user is obtained by a device such as a camera, handset with a camera, and so on. In an example, such digital image can be obtained by uploading an existing image to App. Color set of at least one region of said digital image associated with said user is extracted by said computational circuitry included in the optimal color unit 101. In an example, said region can be a region where a feature of a human body is located. Said extracted color set can be one or more inputs. Then, color recommendation information for at least one of a makeup palette or a hair coloration scheme for at least two other regions of the digital image associated with the user based on one or more inputs indicative of the extracted color set are generated by a prediction model or ranking a sample training set. The details how to generate color recommendation information for at least one of a makeup palette or a hair coloration scheme for at least two other regions of the digital image associated with the user based on one or more inputs indicative of the extracted color set will be discussed later. Finally, said recommendation colors of make-up and/or hair coloration are generated. Forms of generated recommendation colors of make-up and/or hair coloration can be various. In an example, a makeup and hair color unit 102 includes computational circuitry configured to generate one or more instances of a virtual representation of a makeup palette recommendation or a hair coloration scheme recommendation based on the color recommendation information.

Computing device 100 can be, for example, a server of a service provider, a device associated with a client (e.g., a client device), a system on a chip, and/or any other suitable computing device or computing system. In various implementations, computing device 100 can take a variety of different configurations. For example, computing device 100 can be implemented as a computer-like device including a personal computer, desktop computer, multi-screen computer, laptop computer, netbook, and the like. Computing device 100 can also be implemented as a mobile device-like device that includes mobile devices such as mobile phones, portable music players, portable gaming devices, tablet computers, multi-screen computers, and the like. Computing device 100 can also be implemented as a television-like device that includes a device having or connected to a generally larger screen in a casual viewing environment. These devices include televisions, set-top boxes, game consoles, and the like.

In an embodiment, computational circuitry includes, among other things, one or more computing devices such as a processor (e.g., a microprocessor, a quantum processor, qubit processor, etc.), a central processing unit (CPU), a digital signal processor (DSP), an application-specific integrated circuit (ASIC), a field programmable gate array (FPGA), and the like, or any combinations thereof, and can include discrete digital or analog circuit elements or electronics, or combinations thereof. In an embodiment, computational circuitry includes one or more ASICs having a plurality of predefined logic components. In an embodiment, computational circuitry includes one or more FPGAs, each having a plurality of programmable logic components.

In an embodiment, computation circuitry includes one or more electric circuits, printed circuits, flexible circuits, electrical conductors, electrodes, cavity resonators, conducting traces, ceramic patterned electrodes, electro-mechanical components, transducers, and the like.

In an embodiment, computational circuitry includes one or more components operably coupled (e.g., communicatively, electromagnetically, magnetically, ultrasonically, optically, inductively, electrically, capacitively coupled, wirelessly coupled, and the like) to each other. In an embodiment, circuitry includes one or more remotely located components. In an embodiment, remotely located components are operably coupled, for example, via wireless communication. In an embodiment, remotely located components are operably coupled, for example, via one or more communication modules, receivers, transmitters, transceivers, and the like.

In an embodiment, computation circuitry includes memory that, for example, stores instructions or information. Non-limiting examples of memory include volatile memory (e.g., Random Access Memory (RAM), Dynamic Random Access Memory (DRAM), and the like), non-volatile memory (e.g., Read-Only Memory (ROM), Electrically Erasable Programmable Read-Only Memory (EEPROM), Compact Disc Read-Only Memory (CD-ROM), and the like), persistent memory, and the like. Further non-limiting examples of memory include Erasable Programmable Read-Only Memory (EPROM), flash memory, and the like. In an embodiment, memory is coupled to, for example, one or more computing devices by one or more instructions, information, or power buses. In an embodiment, computational circuitry includes one or more databases stored in memory. In an embodiment, computational circuitry includes one or more look-up tables stored in memory.

In an embodiment, computational circuitry includes one or more computer-readable media drives, interface sockets, Universal Serial Bus (USB) ports, memory card slots, and the like, and one or more input/output components such as, for example, a graphical user interface, a display, a keyboard, a keypad, a trackball, a joystick, a touch-screen, a mouse, a switch, a dial, and the like, and any other peripheral device. In an embodiment, computational circuitry includes one or more user input/output components that are operably coupled to at least one computing device configured to control (electrical, electromechanical, software-implemented, firmware-implemented, or other control, or combinations thereof) at least one parameter associated with, for example, determining one or more tissue thermal properties responsive to detected shifts in turn-on voltage.

In an embodiment, computational circuitry includes electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs.

The computing device 100 in accordance with a first aspect of the present disclosure allows consumers to easily select an optimal color scheme for multiple make-up or hair coloration (more than 2) at the same time, rendering a color-wise harmonious natural look.

Figure 2:
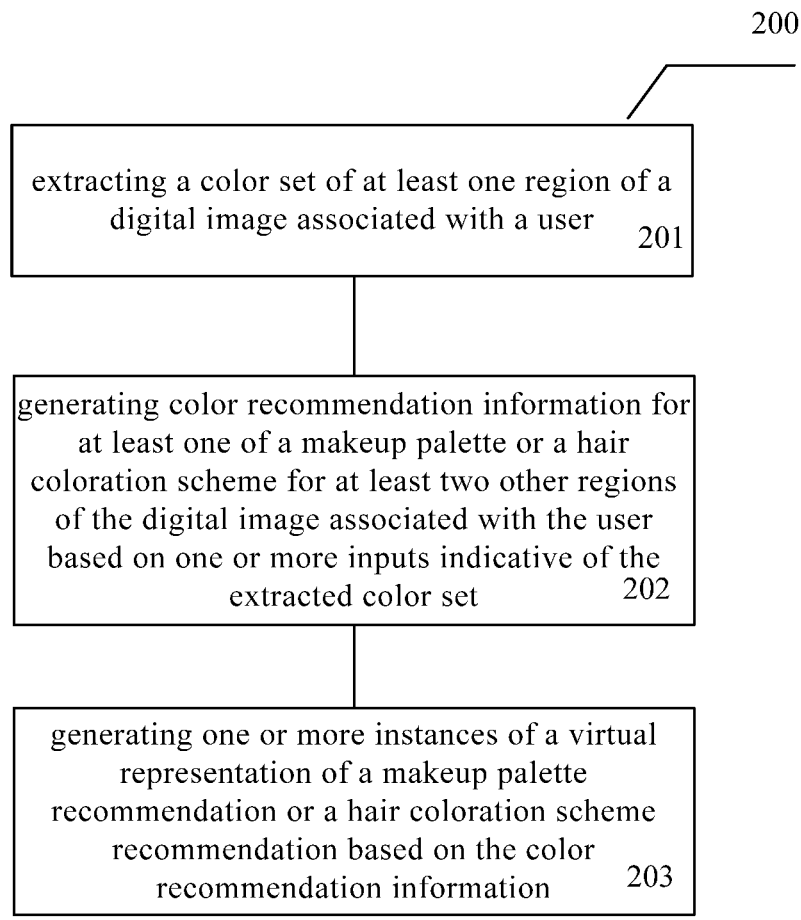
FIG. 2 illustrates a flowchart of a method of recommending at least one of a makeup palette or a hair coloration scheme in accordance with a second aspect of the present disclosure.

FIG. 2 illustrates a flowchart of a method 200 of recommending at least one of a makeup palette or a hair coloration scheme in accordance with a second aspect of the present disclosure.

With the method, the above and other potential deficiencies in the conventional approaches can be overcome. The method 200 starts at block 201. At block 201, color set of at least one region of a digital image associated with a user is extracted. In an example, said digital image associated with said user is obtained by a device such as a camera, handset with a camera, and so on. In an example, such digital image can be obtained by uploading an existing image to App. Further, said digital image can be an image with raw colors or makeup colors. In an example, said region can be a region where a feature of a human body is located. In an embodiment of the present disclosure, said at least one region can be a region where a skin, a hair, a lip, eyebrows, a make-up skin/hair/lip/eyebrows, a clothing, a fingernail, a shoe, an accessory and so on are located. Of course, the present disclosure is not limited to such regions and can be any region in a human body without departing from the scope and spirit of the disclosure. If the consumer would like to lock colors of more than one region (e.g. not only skin tone, but also hair tone unchanged), all these locked regions will be measured. At block 202, color recommendation information for at least one of a makeup palette or a hair coloration scheme for at least two other regions of the digital image associated with the user based on one or more inputs indicative of the extracted color set are generated. Finally, at block 203, said recommended colors are generated. More particularly, block 203 involves generating one or more instances of a virtual representation of a makeup palette recommendation or a hair coloration scheme recommendation based on the color recommendation information. Later, we will introduce how to generate one or more instances of a virtual representation of a makeup palette recommendation or a hair coloration scheme recommendation based on the color recommendation information in more detail.

Thus, the consumers can easily select an optimal color scheme for multiple make-up or hair coloration (more than 2) at the same time, rendering a color-wise harmonious natural look.

FIG. 3 illustrates an example sample training set 300 in accordance with the present disclosure.

The example sample training set 300 is built on basis of 200 users. 4 most common and important parts of woman, i.e. hair tone, skin tone, lip color and eyebrow colors are selected. For each part, we used most common colors for consumer, then match them one by one together to get in total 4*4*3*2=96 different looks as follows:

4 Hair tones (from hair typology, top 4 hair colors by consumer, 90% of all samples)
  Black
  Dark brown
  Brown
  Light brown
4 Skin tones—(from skin typology, chose 4 out of 7 skin tone to be more
  representative of makeup consumer age 18-40, regarding different skin lightness and hue)
  "Fair"—Light and yellow
  "Pink"—Light and red
  "Beige"—Darker and yellow
  "Dark Red"—darker and red
3 Lip tone—MBL lipstick—(typical lipstick color from 3 basic shade zones, i.e. red, orange and pink))
  RedMBL R09 pm
  Orange—MBL C06
  PinkMBL P16
2 Eye brow colors—(most common brow color on market)
  Grey
  Brown We developed a 3 scale scoring for "harmony" perception of consumer. The system will randomly appear each of the 96 photos on the screen and consumer will answer "if the look is harmony in color matching" by good harmony, hard to say or bad harmony and the system will record 1, 0, or −1 scores respectively. We record data for each look by each consumer. Then we have the total score for each look, which is the final "Harmony score". Finally, a sample training set 300 is built as shown in FIG. 3. Such sample training set 300 comprises information for colors of different regions of a plurality of sampled images, information for color combinations for different regions of said plurality of sampled images and information for total scores for each of color combinations as listed in the sample training set 300, such as a first row shows color combination of light brown-brown-beige-pink, colors of light brown, brown, beige, pink and harmony total score of −34. Such sample training set is very important to implement the invention. Information in such sample training set is not limited to this. Such sample training set 300 is only illustrative and the disclosure is not limited to such sample training set 300. As mentioned in above, such sample training set can be also built on basis of color set of a skin, a hair, a lip, eyebrows, a make-up skin/hair/lip/eyebrows, a clothing, a fingernail, a shoe, an accessory and so on and related total scores for each of color combinations.

Figure 4:
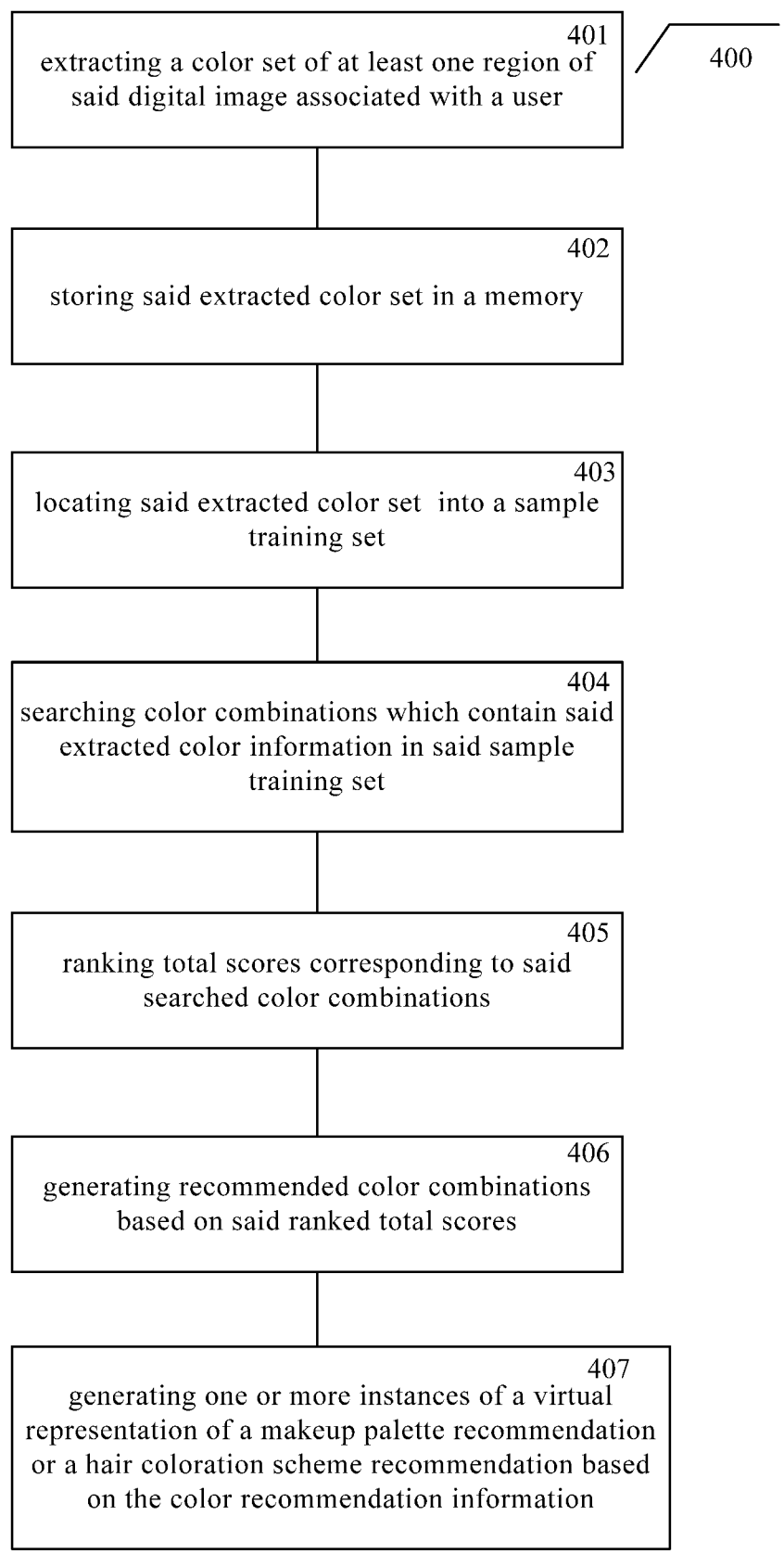
FIG. 4 illustrates a flowchart of a method of recommending at least one of a makeup palette or a hair coloration scheme in accordance with an embodiment of a second aspect of the present disclosure.

FIG. 4 illustrates a flowchart of a method 400 of recommending at least one of a makeup palette or a hair coloration scheme in accordance with an embodiment of a second aspect of the present disclosure.

With the method, the above and other potential deficiencies in the conventional approaches can be overcome. The method comprises block 401, block 402, block 403, block 404, block 405, block 406 and block 407. Block 401 in FIG. 4 is the same as block 201 in FIG. 2, block 407 in FIG. 4 is the same as block 203 in FIG. 2. For the sake of avoiding repetition, blocks 401, 407 are not described and blocks 402, 403, 404, 405, 406 will be described in detail.

At block 402, said extracted color set is stored in a memory. At block 403, said extracted color set is located into a sample training set. Said sample training set can be established beforehand in basis of a lot of sample users as shown in FIG. 3 and it comprises information for colors of different regions of a plurality of sampled images, information for color combinations for different regions of said plurality of sampled images and information for total scores for each of color combinations.

At block 404, color combinations which contain said extracted color set in said sample training set is searched. At block 405, total scores corresponding to said searched color combinations are ranked. At block 406, recommended color combinations based on said ranked total scores are generated.

In an example, a device obtains digital image with lip and extracts lip color as RED, then color combinations which contain RED in said sample training set is searched; then total scores corresponding to said searched color combinations which contain RED are ranked. Finally, recommended color combinations based on said ranked total scores are generated to be presented to a user. In another example, a device can obtain digital image with at least one of a skin, a hair, a lip, eyebrows, a make-up skin/hair/lip/eyebrows, a clothing, a fingernail, a shoe, an accessory and so on. Then, recommended colors of makeup and/or hair coloration for at least two other regions of said source image is generated based on said extracted color set. Finally, recommended color combinations are presented to a user according to the present disclosure. In the disclosure, one or more instances of a virtual representation of a makeup palette recommendation or a hair coloration scheme recommendation based on the color recommendation information can be presented to a user as shown at block 407.

The method 400 of recommending at least one of a makeup palette or a hair coloration scheme in accordance with an embodiment of a second aspect of the present disclosure can yield a color harmony for overall appearance.

In an embodiment of said second aspect, said block 203 of generating color recommendation information for at least one of a makeup palette or a hair coloration scheme for at least two other regions of the digital image associated with the user based on one or more inputs indicative of the extracted color set is achieved by a prediction model. Said prediction model comprises one of Chi-squared Automatic Interaction Detector (CHAID) Decision tree model and Multi-variate Gaussian map classifier and so on, which will be described in detail later.

Figure 5:
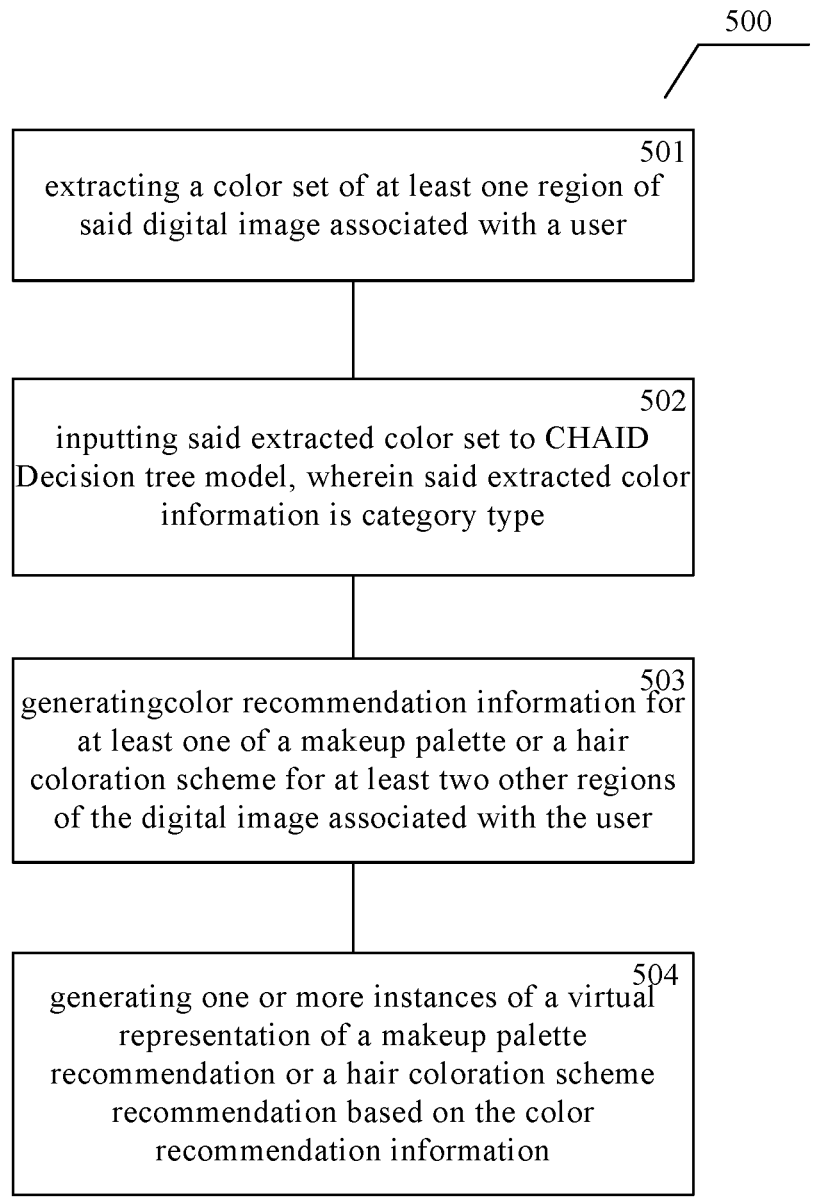
FIG. 5 illustrates a flowchart of a method of recommending at least one of a makeup palette or a hair coloration scheme in accordance with another embodiment of a second aspect of the present disclosure.

FIG. 5 illustrates a flowchart of a method 500 of recommending at least one of a makeup palette or a hair coloration scheme in accordance with another embodiment of a second aspect of the present disclosure.

With the method, the above and other potential deficiencies in the conventional approaches can be overcome. The method comprises block 501, block 502, block 503, block 504. Block 501 in FIG. 5 is the same as block 201 in FIG. 2, and block 504 in FIG. 4 is the same as block 203 in FIG.

2. For the sake of avoiding repetition, blocks 501, 504 are not described and blocks 502, 503 will be descripted in detail.

In an embodiment, said prediction model can comprise Chi-squared Automatic Interaction Detector (CHAID) Decision tree model, which build non-binary trees (i.e. trees where more than two branches can attach to a single root or node) based on a relatively simple algorithm that is particularly well suited for the analysis of larger dataset. At this case, at block 502, said extracted color set is input to CHAID Decision tree model. Said extracted color set is category type, such as red, black, orange etc., Said CHAID Decision tree model is trained from a sample training set, said sample training set comprises information for colors of different regions of a plurality of sampled images, information for color combinations for different regions of said plurality of sample images and information for total scores for each of color combinations. Such sample training set is shown in FIG. 3. In order to make such model more accurate, after establishing CHAID Decision tree model, CHAID Decision tree model needs to be validated. Then, at block 503, color recommendation information for at least one of a makeup palette or a hair coloration scheme for at least two other regions of the digital image associated with the user are generated. Finally, one or more instances of a virtual representation of a makeup palette recommendation or a hair coloration scheme recommendation based on the color recommendation information can be presented to a user as shown at block 504.

Figure 6:
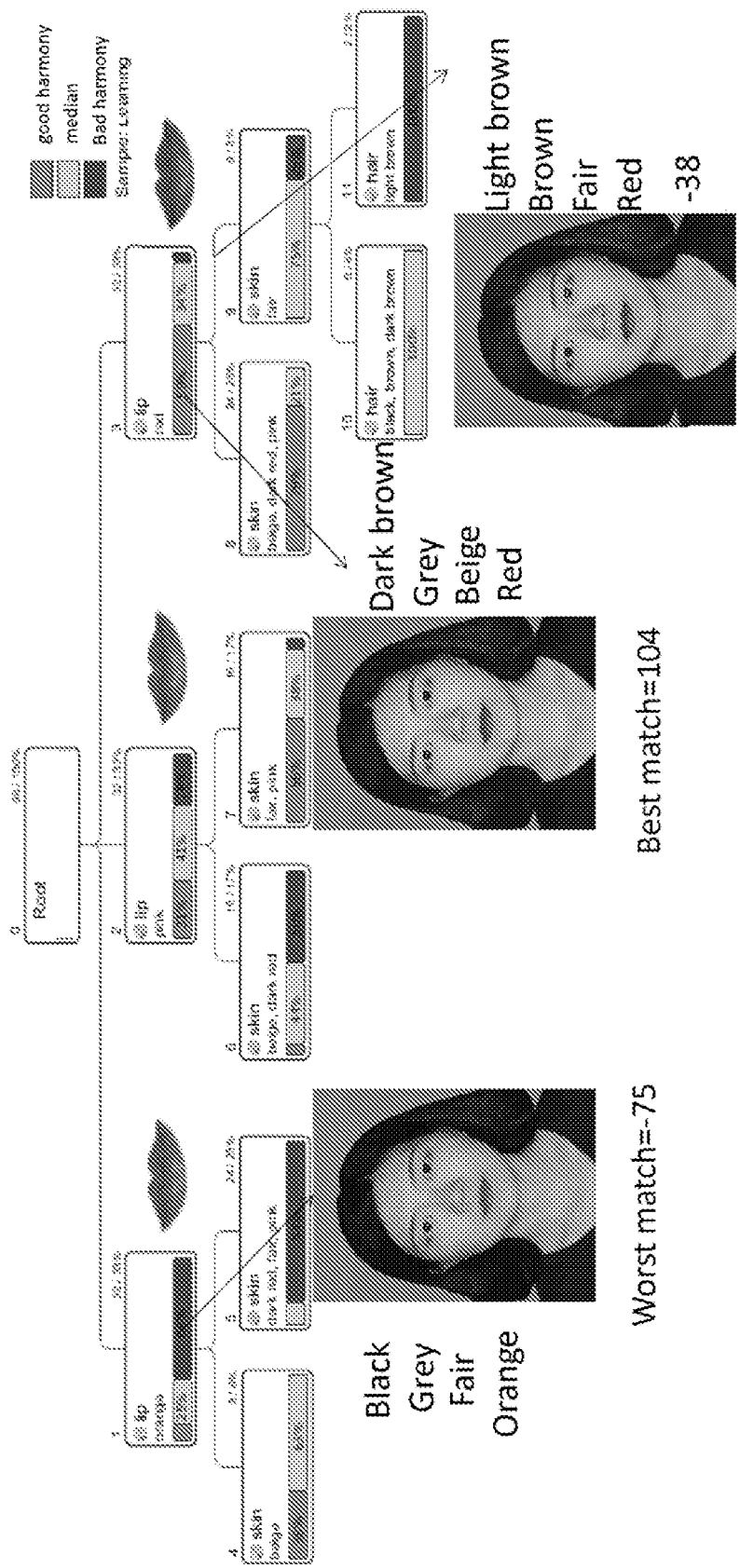
FIG. 6 illustrates an example Chi-squared Automatic Interaction Detector (CHAID) Decision tree model.

FIG. 6 illustrates an example Chi-squared Automatic Interaction Detector (CHAID) Decision tree model 600. FIG. 6 is an example CHAID Decision tree model where a lip is as a starting node. However, regarding the starting point of the decision tree, the color combination introduced by each case may lead to different starting points of the decision tree, that is, sometimes the lip is the most dominant, sometimes it is hair, skin or eyebrow. In this example case, if we want to determine the skin color first, then look for lip color and other matching, then you can make a sub-decision tree for each skin color, so you must first determine the skin color, then enter the sub-decision tree. That is if we want to start the decision tree by differentiate skin tone, we may build one sub-decision-tree for each skin tone by same algorithm.

By the example Chi-squared Automatic Interaction Detector (CHAID) Decision tree model 600, good harmony colors of more regions will be presented to the customer.

The example Chi-squared Automatic Interaction Detector (CHAID) Decision tree model 600 is only illustrative and can be built depending on different needs. For example, if a starting node is at least one of a skin, a hair, a lip, eyebrows, a make-up skin/hair/lip/eyebrows, a clothing, a fingernail, a shoe, an accessory and so on, recommended colors of makeup and/or hair coloration for at least two other regions is generated. Finally, recommended color combinations are presented to a customer.

Figure 7:
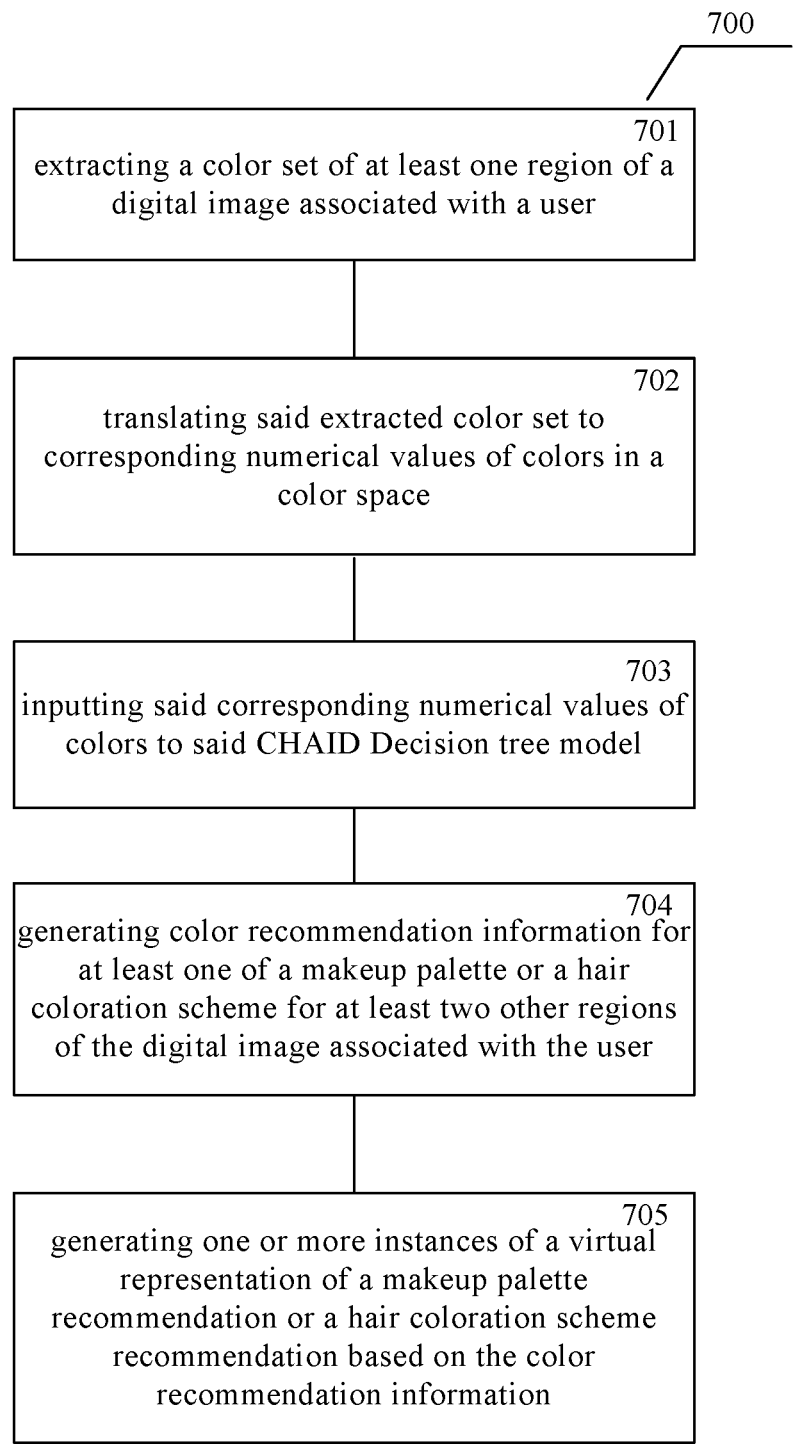
FIG. 7 illustrates a flowchart of a method of recommending at least one of a makeup palette or a hair coloration scheme in accordance with another embodiment of a second aspect of the present disclosure.

FIG. 7 illustrates a flowchart of a method 700 of recommending at least one of a makeup palette or a hair coloration scheme in accordance with another embodiment of a second aspect of the present disclosure.

With the method, the above and other potential deficiencies in the conventional approaches can be overcome. The method 700 comprises block 701, block 702, block 703, block 704, block 705. Block 701 in FIG. 7 is the same as block 201 in FIG. 2 and block 705 in FIG. 7 is the same as block 203 in FIG. 2. For the sake of avoiding repetition, blocks 701, 705 are not described and blocks 702, 703, 704 will be descripted in detail.

In case that said prediction model can comprise Chi-squared Automatic Interaction Detector (CHAID) Decision tree model, said extracted color set can be expressed in corresponding numerical values of colors in a color space. For this, at block 702, said extracted color set is translated to corresponding numerical values of colors in a color space. Such numerical values of colors can be ones in some color spaces below.

A color space as described in above may be defined as a multi-dimensional space, with a point in the multi-dimensional space representing a color value and dimensions of the space representing variables within a color model. For example, in a Red, Green, Blue (RGB) color space, an additive color model defines three variables representing different quantities of red, green and blue light. In a digital model, values for these quantities may be defined with reference to a quantized set of values. For example, a color defined using an 8-bit RGB model may have three values stored in a memory, wherein each variable may be assigned a value between 0 and 255. Other color spaces include: a Cyan, Magenta, Yellow and Black (CMYK) color space, in which four variables are used in a subtractive color model to represent different quantities of colorant (e.g. for a printing system); the International Commission on Illumination (CIE) 1931 XYZ color space, in which three variables ('X', 'Y' and 'Z' or tristimulus values) are used to model a color; the CIE 1976 (L*, a*, b*-CIELAB or 'LAB') color space, in which three variables represent lightness ('L') and opposing color dimensions ('a' and 'b'); and the Yu'v' color space, in which three variables represent the luminance ('Y') and two chrominance dimensions (u' and v').

At block 703, said corresponding numerical values of colors are input to said CHAID Decision tree model. Said CHAID Decision tree model is trained from a sample training set, said sample training set comprises information for numerical values of colors in a color space for different regions of a plurality of sample images and information for total scores for each of color combinations. Such sample training set can be established beforehand. In order to make such model more accurate, after establishing CHAID Decision tree model, CHAID Decision tree model needs to be validated.

At block 704, color recommendation information for at least one of a makeup palette or a hair coloration scheme for at least two other regions of the digital image associated with the user are generated. Finally, color recommendation information can be presented to said user. In an example, a form of color recommendation information can be one or more instances of a virtual representation of a makeup palette recommendation or a hair coloration scheme recommendation as shown at block 805.

By the method 700, it is also possible to build a decision tree model according to the numerical values of color of each region, then we can judge whether the harmony is based on the value of the color. At the same time, it is possible to predict whether a certain color combination is good or not within a certain range.

Figure 8:
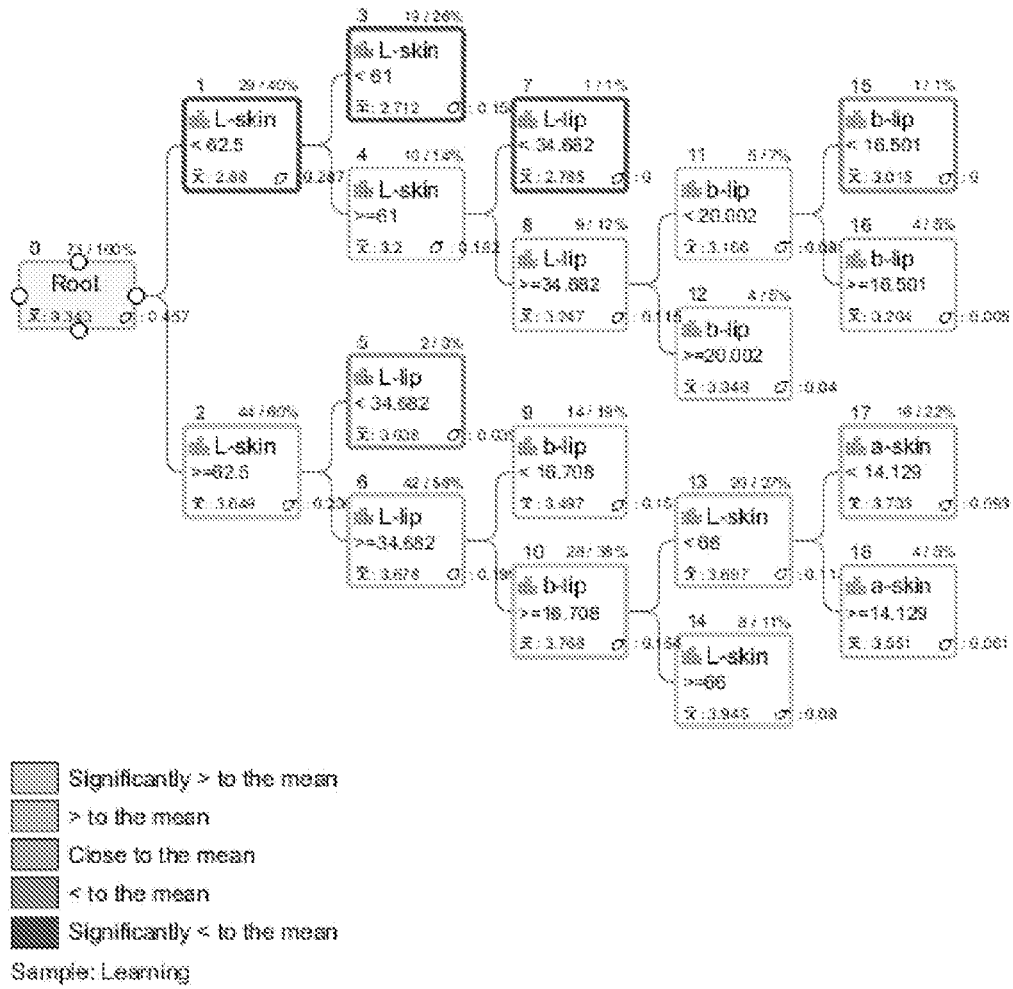
FIG. 8 illustrates another example Chi-squared Automatic Interaction Detector (CHAID) Decision tree model.

FIG. 8 illustrates another example Chi-squared Automatic Interaction Detector (CHAID) Decision tree model 800.

In this Chi-squared Automatic Interaction Detector (CHAID) Decision tree model, input is numerical values of colors (I, a, b). By using numerical values of colors(l,a,b), we are able to build a recommendation decision tree model for prediction, in order to recommend not only the exact tested colour-combination in our data base and but also allow us to predict some other colors which are close to the desired range. Of course, a color space can be extended to the above-mentioned color space without departing from the protection scope of the invention.

Figure 9:
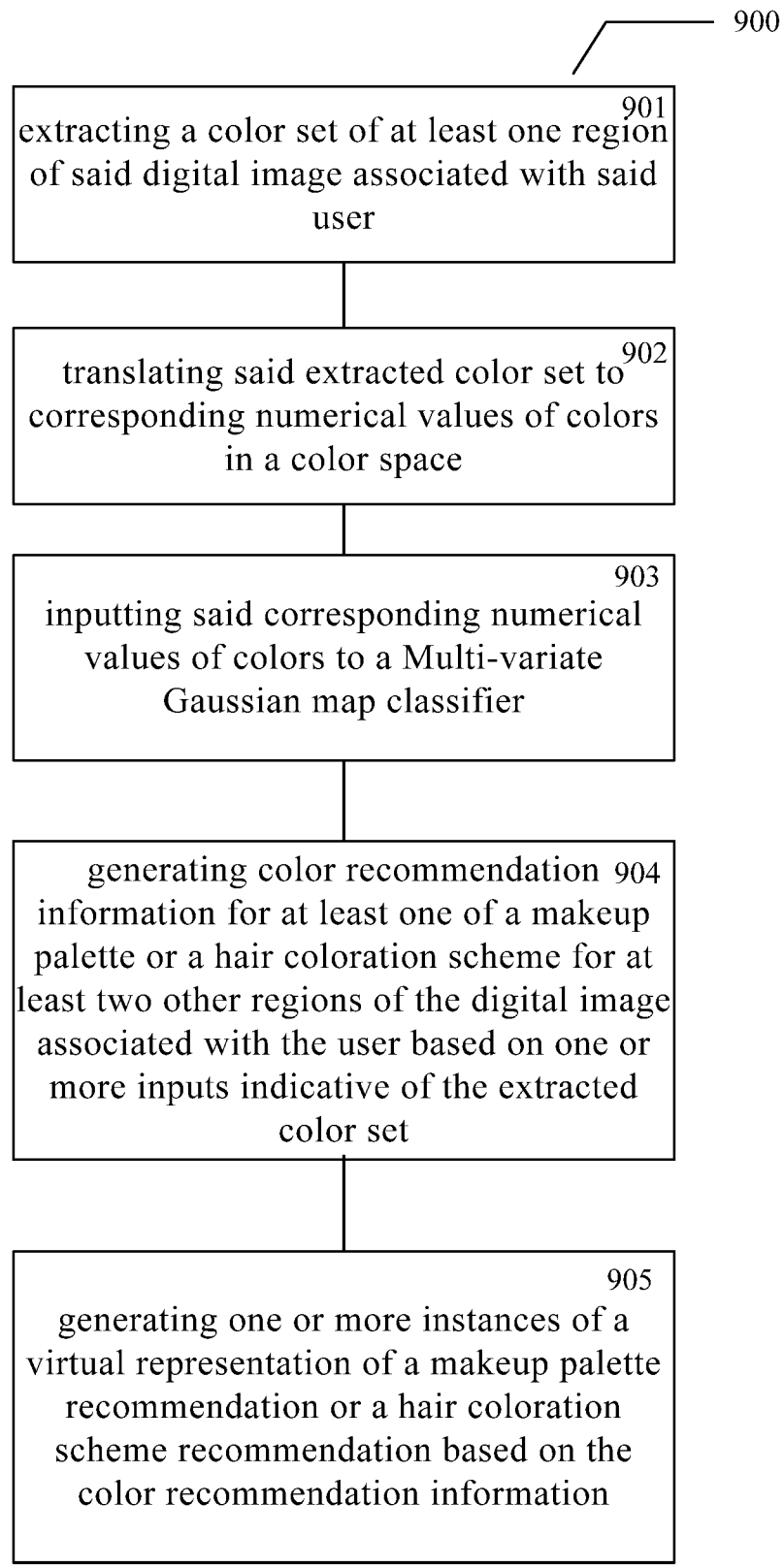
FIG. 9 illustrates a flowchart of a method of recommending at least one of a makeup palette or a hair coloration scheme in accordance with another embodiment of a second aspect of the present disclosure.

FIG. 9 illustrates a flowchart of a method 900 of recommending at least one of a makeup palette or a hair coloration scheme in accordance with another embodiment of a second aspect of the present disclosure.

With the method, the above and other potential deficiencies in the conventional approaches can be overcome. The method 900 comprises block 901, block 902, block 903, block 904, block 905. Block 901 in FIG. 9 is the same as block 201 in FIG. 2 and block 905 in FIG. 9 is the same as block 203 in FIG. 2. For the sake of avoiding repetition, blocks 901, 905 are not described and blocks 902, 903, 904 will be described in detail.

When said prediction model comprises Multi-variate Gaussian map classifier, at block 902 said extracted color set is translated to corresponding numerical values of colors in a color space. Such numerical values of colors can be ones in some color spaces mentioned in above. At block 903, said corresponding numerical values of colors are input to a Multi-variate Gaussian map classifier. Said Multi-variate Gaussian map classifier is trained from a sample training set, said sample training set comprises information for numerical values of colors for different regions of a plurality of sample images and information for total scores for each of colors combination.

At block 904, color recommendation information for at least one of a makeup palette or a hair coloration scheme for at least two other regions of the digital image associated with the user based on one or more inputs indicative of the extracted color set is generated. In this method 900, by inputting a new data point into the space, it is to be determined whether it is "close enough" to any of data clouds in order to predict whether some color combination is good harmony or not. Finally, color recommendation information can be presented to said user. In an example, a form of color recommendation information can be one or more instances of a virtual representation of a makeup palette recommendation or a hair coloration scheme recommendation as shown at block 905.

Figure 10:
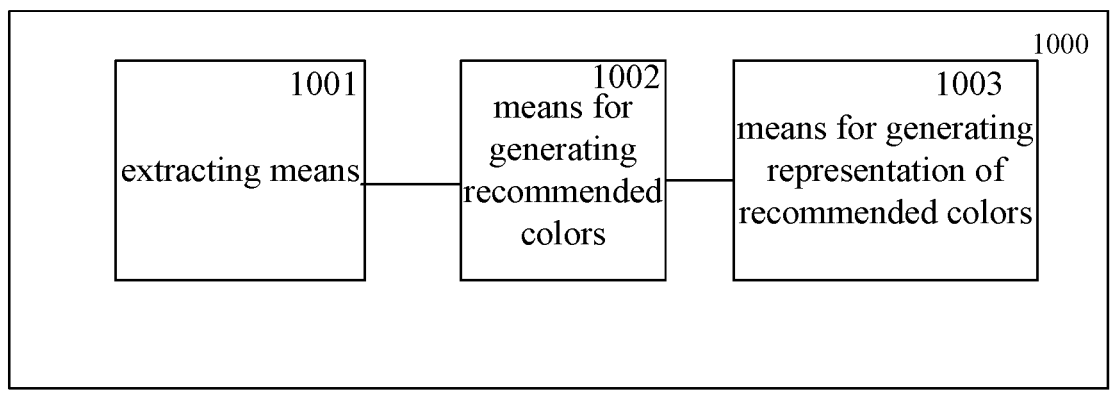
FIG. 10 illustrates a block diagram of an apparatus of recommending at least one of a makeup palette or a hair coloration scheme in accordance with a third aspect of the present disclosure.

FIG. 10 illustrates a block diagram of an apparatus 1000 of recommending at least one of a makeup palette or a hair coloration scheme in accordance with a third aspect of the present disclosure.

Said apparatus 100 for recommending at least one of a makeup palette or a hair coloration scheme comprises means 1001 for extracting color set of at least one region of a digital image associated with a user; means 1002 for generating color recommendation information for at least one of a makeup palette or a hair coloration scheme for at least two other regions of the digital image associated with the user based on one or more inputs indicative of the extracted color set; and means 1003 for generating one or more instances of a virtual representation of a makeup palette recommendation or a hair coloration scheme recommendation based on the color recommendation information.

Means 1002 for generating color recommendation information for at least one of a makeup palette or a hair coloration scheme for at least two other regions of the digital image associated with the user based on one or more inputs indicative of the extracted color set can be achieved by a prediction model or a computation circuitry.

Said computation circuitry can comprise means for storing said extracted color set, means for locating said extracted color set into a sample training set, wherein said sample training set comprises information for colors of different regions of a plurality of sampled images, information for color combinations for different regions of said plurality of sampled images and information for total scores for each of color combinations; means for searching color combinations which contain said extracted color set in said sample training set; means for ranking total scores corresponding to said searched color combinations; means for generating recommended color combinations based on said ranked total scores.

Said prediction model can comprise, but not limited to Chi-squared Automatic Interaction Detector (CHAID) Decision tree model or Multi-variate Gaussian map classifier as mentioned in above.

The above description is only illustrative and is not limited to this. The disclosure can achieve technical solutions where if color set of at least one of a skin, a hair, a lip, eyebrows, a make-up skin/hair/lip/eyebrows, a clothing, a fingernail, a shoe, an accessory and so on is as an input, recommended colors of at least two of a make-up skin/hair/lip/eyebrows can be output.

According to the above disclosure, the invention can easily recommend an optimal color scheme for multiple make-up or hair coloration (more than 2) at the same time based on scientific and objective evaluation of chromatic factors on consumer (natural skin tone, hair shade, eye color, etc.), rendering a color-wise harmonious natural look.

An embodiment of the disclosure may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While the embodiments have been illustrated and described herein, it will be understood by those skilled in the art that various changes and modifications may be made, and equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A computing device, comprising:
   an optimal color unit including computational circuitry configured to extract a color set of at least one region of a digital image associated with a user, and to generate color recommendation information for at least one of a makeup palette or a hair coloration scheme for at least two other regions of the digital image associated with the user based on one or more inputs indicative of the extracted color set; and
   a makeup and hair color unit including computational circuitry configured to generate one or more instances of a virtual representation of a makeup palette recommendation or a hair coloration scheme recommendation based on the color recommendation information,
wherein the color recommendation information is a recommendation for a combination of colors of at least one region and at least two other regions,
wherein the optimal color unit includes computational circuitry which is further configured to:
store the extracted color set in a memory;
locate said extracted color set into a sample training set, wherein said sample training set comprises information for colors of different regions of a plurality of sampled images, information for color combinations for different regions of said plurality of sampled images and information for total scores for each of color combinations;
search color combinations which contain said extracted color set in said sample training set;
rank total scores corresponding to said searched color combinations;
generate recommended color combinations based on said ranked total scores.

2. The computing device according to claim 1, wherein the optimal color unit includes computational circuitry which is further configured to generate color recommendation information for at least one of a makeup palette or a hair coloration scheme for at least two other regions of the digital image associated with the user based on one or more inputs indicative of the extracted color set by a prediction model.

3. The computing device according to claim 2, wherein said prediction model comprises one of Chi-squared Automatic Interaction Detector (CHAID) Decision tree model and Multi-variate Gaussian map classifier.

4. The computing device according to claim 3, wherein when said prediction model comprises Chi-squared Automatic Interaction Detector (CHAID) Decision tree model, the optimal color unit includes computational circuitry which is further configured to:
input said extracted color set to said CHAID Decision tree model, wherein said extracted color set is category type, said CHAID Decision tree model is trained from a sample training set, said sample training set comprises information for colors of different regions of a plurality of sampled images, information for color combinations for different regions of said plurality of sampled images and information for total scores for each of color combinations;
generate color recommendation information for at least one of a makeup palette or a hair coloration scheme for at least two other regions of the digital image associated with the user.

5. The computing device according to claim 3, wherein when said prediction model comprises Chi-squared Automatic Interaction Detector (CHAID) Decision tree model, the optimal color unit includes computational circuitry which is further configured to:
translate said extracted color set to corresponding numerical values of colors in a color space;
input said corresponding numerical values of colors to said CHAID Decision tree model, said CHAID Decision tree model is trained from a sample training set, said sample training set comprises information for numerical values of colors in a color space for different regions of a plurality of sampled images and information for total scores for each of color combinations;
generate color recommendation information for at least one of a makeup palette or a hair coloration scheme for at least two other regions of the digital image associated with the user.

6. The computing device according to claim 3, wherein when said prediction model comprises Multi-variate Gaussian map classifier, the optimal color unit includes computational circuitry which is further configured to:
translate said extracted color set to corresponding numerical values of colors in a color space;
input said corresponding numerical values of colors to said Multi-variate Gaussian map classifier, said Multi-variate Gaussian map classifier is trained from a sample training set, said sample training set comprises information for numerical values of colors in a color space for different regions of a plurality of sampled images and information for total scores for each of color combinations;
generate color recommendation information for at least one of a makeup palette or a hair coloration scheme for at least two other regions of the digital image associated with the user.

7. The computing device according to claim 1, wherein said at least one region, said at least two other regions and different regions can be regions where a feature of a body of said user is located.

8. A method for recommending at least one of a makeup palette or a hair coloration scheme, the method comprising:
extracting a color set of at least one region of a digital image associated with a user;
generating color recommendation information for at least one of a makeup palette or a hair coloration scheme for at least two other regions of the digital image associated with the user based on one or more inputs indicative of the extracted color set; and
generating one or more instances of a virtual representation of a makeup palette recommendation or a hair coloration scheme recommendation based on the color recommendation information,
wherein the color recommendation information is a recommendation for a combination of colors of at least one region and at least two other regions,
wherein said generating color recommendation information for at least one of a makeup palette or a hair coloration scheme for at least two other regions of the digital image associated with the user based on one or more inputs indicative of the extracted color set comprising:
storing said extracted color set in a memory;
locating said extracted color set into a sample training set, wherein said sample training set comprises information for colors of different regions of a plurality of sampled images, information for color combinations for different regions of said plurality of sampled images and information for total scores for each of color combinations;
searching color combinations which contain said extracted color set in said sample training set;
ranking total scores corresponding to said searched color combinations;
generating recommended color combinations based on said ranked total scores.

9. The method according to claim 8, wherein said generating color recommendation information for at least one of a makeup palette or a hair coloration scheme for at least two other regions of the digital image associated with the user based on one or more inputs indicative of the extracted color set is achieved by a prediction model,
  wherein said prediction model comprises one of Chi-squared Automatic Interaction Detector (CHAID) Decision tree model and Multi-variate Gaussian map classifier.

10. The method according to claim 9, wherein when said prediction model comprises Chi-squared Automatic Interaction Detector (CHAID) Decision tree model, said generating color recommendation information for at least one of a makeup palette or a hair coloration scheme for at least two other regions of the digital image associated with the user based on one or more inputs indicative of the extracted color set comprising:
  inputting said extracted color set to said CHAID Decision tree model, wherein said extracted color set is category type, said CHAID Decision tree model is trained from a sample training set, said sample training set comprises information for colors of different regions of a plurality of sampled images, information for color combinations for different regions of said plurality of sampled images and information for total scores for each of color combinations;
  generating color recommendation information for at least one of a makeup palette or a hair coloration scheme for at least two other regions of the digital image associated with the user.

11. The method according to claim 9, wherein when said prediction model comprises Chi-squared Automatic Interaction Detector (CHAID) Decision tree model, said generating color recommendation information for at least one of a makeup palette or a hair coloration scheme for at least two other regions of the digital image associated with the user based on one or more inputs indicative of the extracted color set comprising:
  translating said extracted color set to corresponding numerical values of colors in a color space;
  inputting said corresponding numerical values of colors to said CHAID Decision tree model, said CHAID Decision tree model is trained from a sample training set, said sample training set comprises information for numerical values of colors in a color space for different regions of a plurality of sampled images and information for total scores for each of color combinations;
  generating color recommendation information for at least one of a makeup palette or a hair coloration scheme for at least two other regions of the digital image associated with the user.

12. The method according to claim 9, wherein when said prediction model comprises Multi-variate Gaussian map classifier, said generating color recommendation information for at least one of a makeup palette or a hair coloration scheme for at least two other regions of the digital image associated with the user based on one or more inputs indicative of the extracted color set comprising:
  translating said extracted color set to corresponding numerical values of colors in a color space;
  inputting said corresponding numerical values of colors to said Multi-variate Gaussian map classifier, said Multi-variate Gaussian map classifier is trained from a sample training set, said sample training set comprises information for numerical values of colors in a color space for different regions of a plurality of sampled images and information for total scores for each of color combinations;
  generating color recommendation information for at least one of a makeup palette or a hair coloration scheme for at least two other regions of the digital image associated with the user.

13. The method according to claim 8, wherein said at least one region, said at least two other regions and said different regions can be regions where a feature of a body of said user is located.

14. A non-transitory computer readable medium having stored thereon instructions that when executed cause a computing device to perform the method according to claim 8.

15. An apparatus for recommending at least one of a makeup palette or a hair coloration scheme, comprising:
  means for extracting a color set of at least one region of a digital image associated with a user;
  means for generating color recommendation information for at least one of a makeup palette or a hair coloration scheme for at least two other regions of the digital image associated with the user based on one or more inputs indicative of the extracted color set; and
  means for generating one or more instances of a virtual representation of a makeup palette recommendation or a hair coloration scheme recommendation based on the color recommendation information,
  wherein the color recommendation information is a recommendation for a combination of colors of at least one region and at least two other regions,
  wherein said means for generating color recommendation information for at least one of a makeup palette or a hair coloration scheme for at least two other regions of the digital image associated with the user based on one or more inputs indicative of the extracted color set comprising:
  means for storing said extracted color set;
  means for locating said extracted color set into a sample training set, wherein said sample training set comprises information for colors of different regions of a plurality of sampled images, information for color combinations for different regions of said plurality of sampled images and information for total scores for each of color combinations;
  means for searching color combinations which contain said extracted color information in said sample training set;
  means for ranking total scores corresponding to said searched color combinations;
  means for generating recommended color combinations based on said ranked total scores.

16. The apparatus according to claim 15, wherein said means for generating color recommendation information for at least one of a makeup palette or a hair coloration scheme for at least two other regions of the digital image associated with the user based on one or more inputs indicative of the extracted color set is achieved by a prediction model,
  wherein said prediction model comprises one of Chi-squared Automatic Interaction Detector (CHAID) Decision tree model and Multi-variate Gaussian map classifier.

17. The apparatus according to claim 16, wherein when said prediction model comprises Chi-squared Automatic Interaction Detector (CHAID) Decision tree model, said means for generating color recommendation information for at least one of a makeup palette or a hair coloration scheme for at least two other regions of the digital image associated with the user based on one or more inputs indicative of the extracted color set comprising:

means for inputting said extracted color set to said CHAID Decision tree model, wherein said extracted color information is category type, said CHAID Decision tree model is trained from a sample training set, said sample training set comprises information for colors of different regions of a plurality of sampled images, information for color combinations for different regions of said plurality of sampled images and information for total scores for each of color combinations;

means for generating color recommendation information for at least one of a makeup palette or a hair coloration scheme for at least two other regions of the digital image associated with the user.

18. The apparatus according to claim 16, wherein when said prediction model comprises Chi-squared Automatic Interaction Detector (CHAID) Decision tree model, said means for generating color recommendation information for at least one of a makeup palette or a hair coloration scheme for at least two other regions of the digital image associated with the user based on one or more inputs indicative of the extracted color set comprising:

means for translating said extracted color set to corresponding numerical values of colors in a color space;

means for inputting said corresponding numerical values of colors to said CHAID Decision tree model, said CHAID Decision tree model is trained from a sample training set, said sample training set comprises information for numerical values of colors in a color space for different regions of a plurality of sampled images and information for total scores for each of color combinations;

means for generating color recommendation information for at least one of a makeup palette or a hair coloration scheme for at least two other regions of the digital image associated with the user.

19. The apparatus according to claim 16, wherein when said prediction model comprises Multi-variate Gaussian map classifier, said means for generating color recommendation information for at least one of a makeup palette or a hair coloration scheme for at least two other regions of the digital image associated with the user based on one or more inputs indicative of the extracted color set comprising:

means for translating said extracted color set to corresponding numerical values of colors in a color space;

means for inputting said corresponding numerical values of colors to said Multi-variate Gaussian map classifier, said Multi-variate Gaussian map classifier is trained from a sample training set, said sample training set comprises information for numerical values of colors in a color space for different regions of a plurality of sampled images and information for total scores for each of color combinations;

means for generating color recommendation information for at least one of a makeup palette or a hair coloration scheme for at least two other regions of the digital image associated with the user.

20. The apparatus according to claim 15, wherein said at least one region, said at least two other regions and different regions can be regions where a feature of a body of said user is located.

* * * * *